Oct. 3, 1939.  E. T. FERNGREN  2,175,053
PROCESS AND APPARATUS FOR WORKING ORGANIC PLASTIC
MATERIAL AND PRODUCING CONTAINERS THEREFROM
Filed Aug. 18, 1936  4 Sheets-Sheet 4

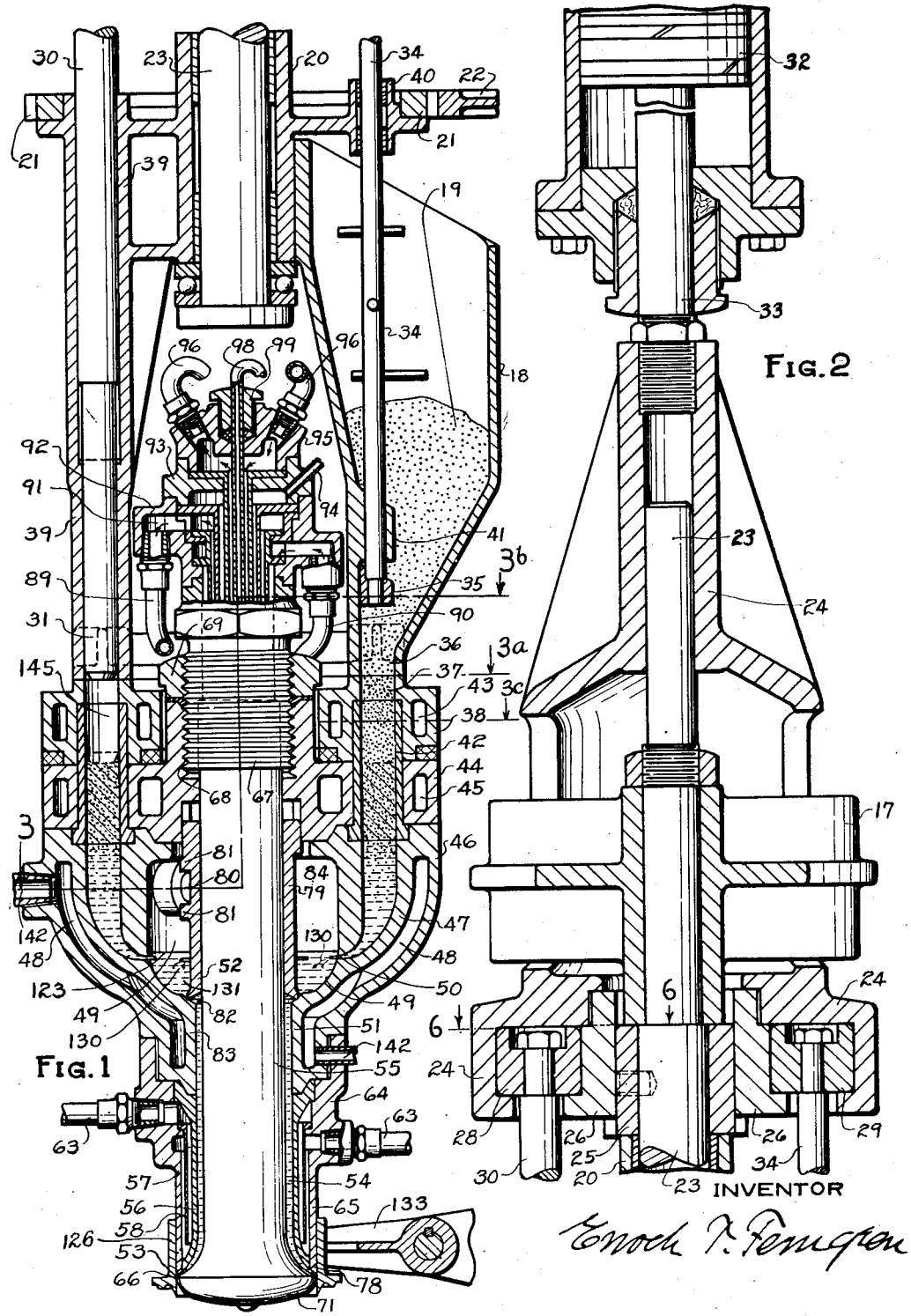

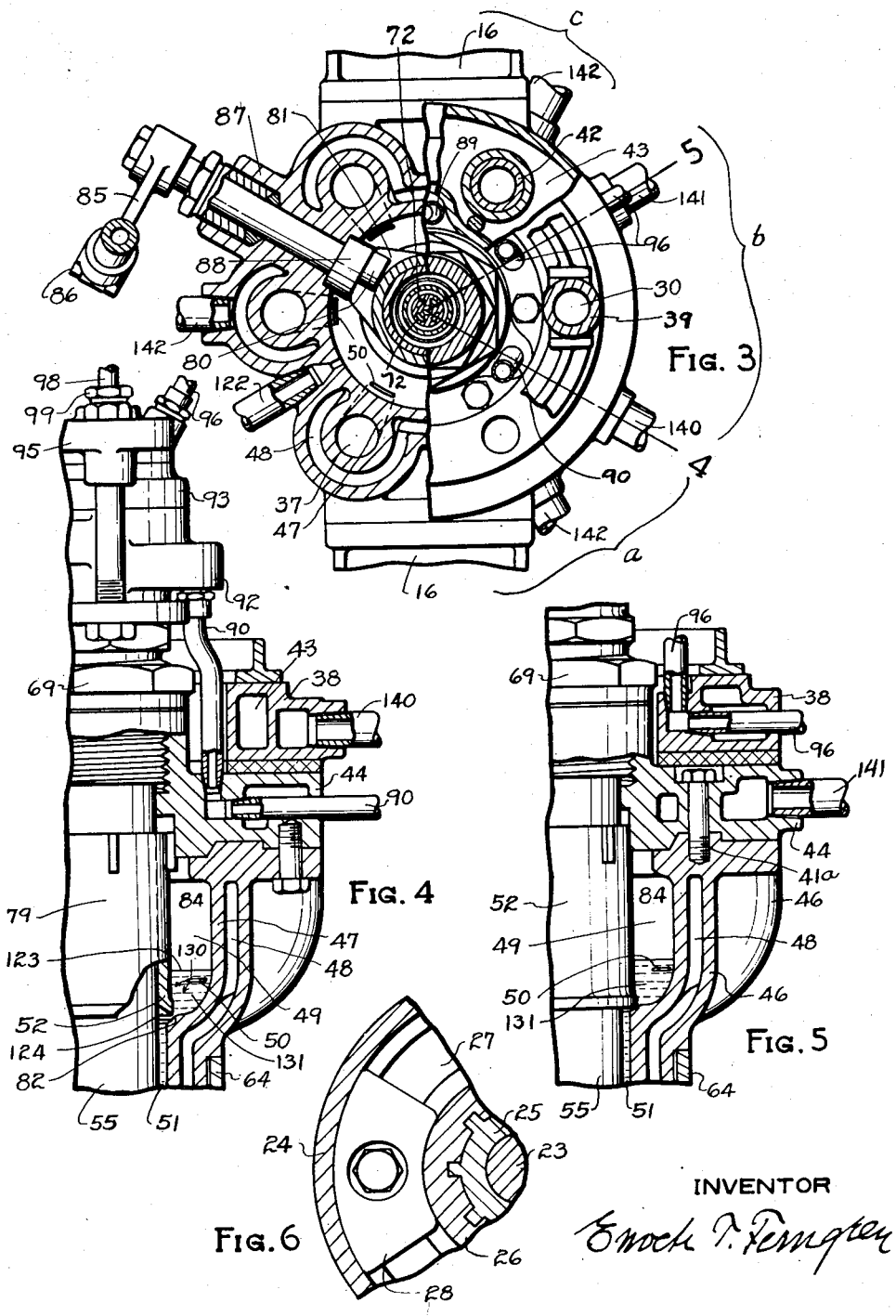

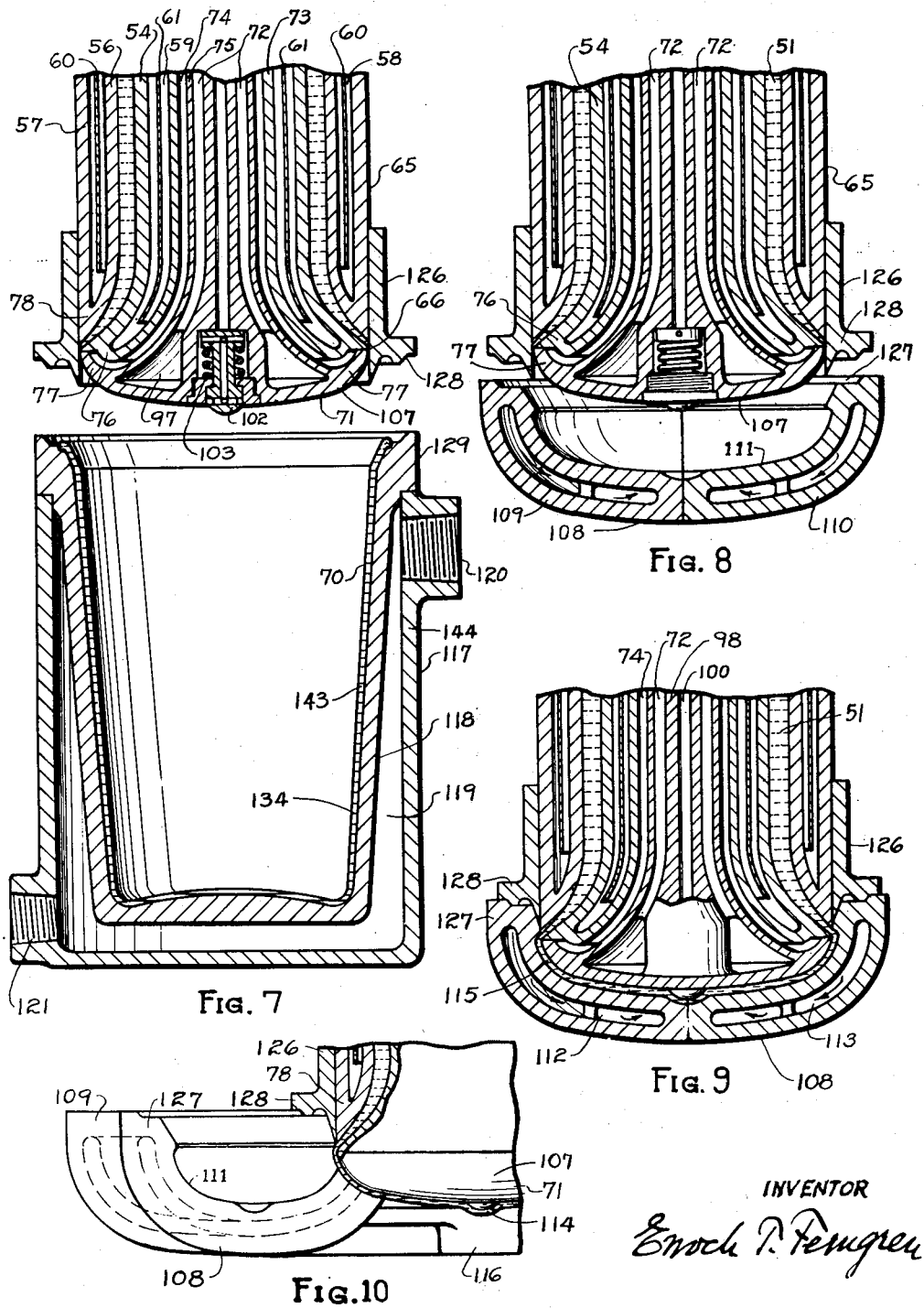

INVENTOR.
Enoch T. Ferngren

Patented Oct. 3, 1939

2,175,053

UNITED STATES PATENT OFFICE 2,175,053

PROCESS AND APPARATUS FOR WORKING ORGANIC PLASTIC MATERIAL AND PRODUCING CONTAINERS THEREFROM

Enoch T. Ferngren, Jackson Heights, Long Island, N. Y., assignor, by mesne assignments, to Plax Corporation, Hartford, Conn., a corporation of Delaware Application August 18, 1936, Serial No. 96,560

36 Claims. (Cl. 18—14)

This invention relates to the making of containers or hollow articles from thermo-plastic materials, which become plastic and partly fluid under heat and pressure and which in such condition may be extruded at predetermined temperatures, usually from 225 to 440 F., when acted upon by relatively high pressures, such as a pressure of 7,000 pounds per square inch, for liquefying the plastic material and relatively lower pressures, as from 25 to 500 pounds square inch, for the extrusion of the liquified plastic material.

The invention comprises a process in which a thermo-plastic material is used, and comprises in part a form of pressure molding to produce a closed bottom or end wall for a tubular wall formation subsequently to be extruded. The bottom wall is formed for closing the lower end of a tubular body of material in a plastic condition, which may be considered a hollow blank and which is then progressively expanded by air admitted thereinto as the tubular wall portion is progressively extruded from a parent supply body of the plastic material. The hollow blank thus formed is surrounded by a forming mold and subsequently expanded by blowing to the shape of the mold.

The materials employed may include cellulose derivatives which may be combined with synthetic products such as resins and resinoids, products of polymerization and/or condensation and with solid or liquid plasticising materials. Certain materials which may thus be used act as solvents when heated and usually soften or dissolve the cellulose derivatives when the combined material is heated, thereby producing transparency and a desired condition of plasticity in the combined body, which permits relatively easy extrusion and molding according to my process.

Many materials other than those hereinabove specifically mentioned are susceptible of use in carrying out the process herein disclosed. I contemplate that any suitable material may be used, such suitable materials being substantially all included in the general classification of organic plastic materials which are expansible by blowing and thereafter capable of being rigidified.

I prefer to use plastic materials for the making of containers, which are transparent or translucent and also odorless and tasteless so that beverages and merchandise of various kinds may be visible while being kept uncontaminated.

One of the principal objects of the invention is to provide processes and apparatus for the handling and treating a transparent plastic material, while it is being used in the making of articles, so that it may remain transparent and so that the same material may be used repeatedly under the same or similar conditions of treatment without objectionable darkening or changing color.

The ability to maintain uniform transparency is of importance as the material entering into or comprising the structure of a once used article, such for instance as a milk bottle, may thereby be reclaimed and used repeatedly to produce new freshly made bottles. The procedure is to collect used bottles, clean and granulate the material thereof, and feed this material into the apparatus to form other bottles, thereby saving a considerable portion of the original cost of the material. This lowers the average net cost of the container.

In practice then, the actual net cost of the material which must be added in making over containers by this process may be one-tenth of the original cost of the total amount of material in use. New material may be added to the feed batches for the machine during the continuous production of containers in amounts of from 5% to 20% of the total material used.

Most of the transparent organic plastic materials now commercially available are liable to change in color or transparency when exposed to heat for a long period of time. Hence an object of this invention is to convert a solid, plastic material into a fluent, pasty or soft plastic condition in a minimum time and thereafter to convert or form the soft and plastic material quickly into the required article.

Another object is to provide a system of replacement of the plastic material in process in the apparatus, so that all portions of the semi-liquid supply of plastic material may progress continuously through the apparatus and be progressively and substantially continuously replaced by the addition of freshly liquefied or softened material at a series of equally spaced supply points. In connection with this system it is also an object preliminarily to compact and preheat the material so that it may be softened before being acted upon by high pressure and heat for rendering it softly plastic or semi-liquid, and thereafter to maintain the conditioned material under pneumatic pressure and heat in a supply chamber of small size until it is extruded therefrom into a tubular passage or annular space where it is exposed constantly to heat and intermittently to extrusive pressure before or during ejection, delivery or propulsion through and out of said passage.

While the foregoing objects relate mainly to the obtaining of a quick conversion of the plastic material from a solid to a soft or plastic state and to the rapid and uniform movement of the plastic material from the point of introduction thereof into the apparatus to the place where the article is formed, the successive steps of the process hereinafter described also provide for the elimination of gas or air bubbles and the production of plastic material of uniform consistency as to transparency, viscosity, cohesiveness and degrees of fluency, solidity and density.

The invention also comprises a process of producing articles such as containers, tumblers, drinking cups, jars or bottles from an extruded plastic material. In this connection the way of forming the bottom wall portions as an integral part of the vessel which is to be made is a novel procedure as is also the manner of severing the side wall of the vessel from the parent body of plastic material and of shaping a lip or bead on the upper end of such side wall.

Another object, with regard to the handling of certain types of plastic material adjacent the point of extrusion from a passage, is to remove some of the contained heat from the confined plastic body and from the wall portion thereof being extruded from the passage to effect a partial setting or solidification in the surface skin of the material, so as locally to increase the cohesiveness, this being particularly useful when a relatively thin wall is being extruded.

In forming a bottom wall portion for an extruding tube of a plastic material, it may be advantageous to produce a cooling effect on the inner face of the plastic bottom wall in order to reduce the tendency which some plastic materials have of adhering to heated molding surfaces against which they are pressed. For this purpose adequate temperature control means for cooling the bottom portion of the extrusion member are hereby provided so that this member can function as an upper molding member for the bottom wall of an article and thus insure the release of the upper surface of the plastic bottom wall from the bottom wall of the nozzle when the side wall portions of the article are subsequently extruded.

Other features of the invention will be hereinafter pointed out and also set forth in the claims.

In the drawings:

Figures 1 and 2 are views substantially in central vertical section of an extruding apparatus in accordance with this invention, Fig. 1 illustrating the lower portion of the apparatus and Fig. 2, the upper portion thereof;

Fig. 3 is a composite horizontal sectional view, the left portion of the figure being on the line 3, and the sectors a, b and c, on the lines 3a, 3b and 3c respectively, all of Fig. 1;

Fig. 4 is a fragmentary view in vertical section on the radial line 4 of Fig. 3;

Fig. 5 is a fragmentary view in vertical section on the radial line 5 of Fig. 3;

Fig. 6 is a fragmentary view in horizontal section on the line 6—6 of Fig. 2;

Fig. 7 is a fragmentary view in vertical section of the extrusion nozzle and a tumbler mold, showing the relationship of the mold to the nozzle parts following the completion of the formation of an article;

Fig. 8 is a fragmentary view in central vertical section showing a portion of the extruding nozzle before any forming has taken place and also showing the lower bottom wall-forming mold portions during the approach thereof toward the nozzle and before they engage the cutter element;

Fig. 9 is a similar view of the bottom wall-forming mold portions in alignment with the cylindrical cutter on the extrusion nozzle during the molding of the bottom wall of a tumbler;

Fig. 10 is a somewhat similar fragmentary view showing the position of the film wall at the lower end of the nozzle with the lower outer mold portions withdrawn;

Figures 12, 13:
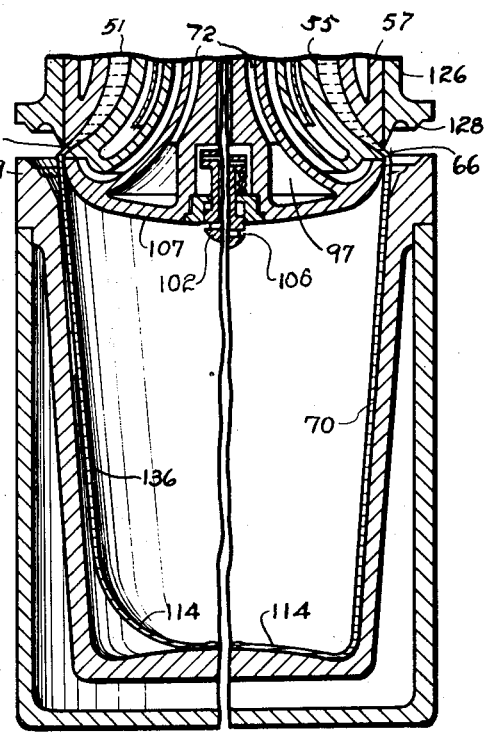
Figure 14:
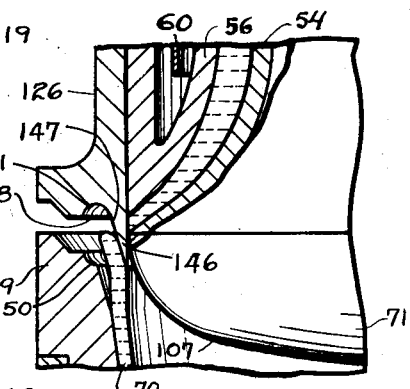
Figure 15:
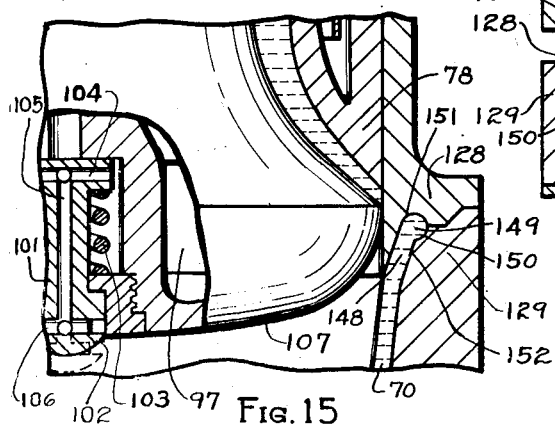

Figs. 12 and 13 are views similar to Figs. 7, 8 and 9 illustrating the relationship of the extruded plastic material to the wall of the shaping mold during the final stages of the extruding and blowing of an article; and Figs. 14 and 15 are enlarged fragmentary views in central vertical section showing the making of a lip or bead at the upper edge of a tumbler, Fig. 15 also showing the locked position of the mold, the cutter and the nozzle at the instant of high pressure air application.

The extrusion apparatus for thermo-plastic material exemplified in Figs. 1 to 6 is mainly supported by structural parts 16 and 17, which are extensions of a main supporting structure (not shown).

A hopper 18, Fig. 1, containing shredded or granular thermo-plastic material 19 is firmly secured to a rotatable hub structure 20, which is given a step by step rotation or movement by gears 21 and 22, the former being a large ring gear secured to the hub 20.

The hub 20 is supported by a concentric vertical shaft 23, which is firmly held by the structural part 17, Fig. 2. The upper end of the shaft 23 acts as a guide for a vertically reciprocating ram extension 24. The lower end of the ram extension 24 has secured thereto a member 26, which is vertically slidable on a stationary annular member 25, the member 26 and the adjacent portion of the ram extension 24 forming an annular guideway 27 for slidable segment blocks 28 and 29, Figs. 2 and 6. The block 28 is connected with the upper end of a plunger shaft 30, the lower end 31 of which functions to apply pressure to the plastic material as hereinafter described. The ram comprises a piston 32, Fig. 2, and a piston rod 33, which is connected to the ram extension 24 as shown. Suitable means (not shown) may be provided for moving the piston in its cylinder.

The block 29 is connected to the upper end of a packing plunger 34, the lower end 35 of which serves to compact the plastic material 19 in the lower portion 36 of the hopper 18, forcing the material therefrom successively into bores 37 of a stationary magazine or receiver 38. In these bores the granular material is compacted into more or less firm plugs, which are subsequently and successively acted upon by the lower end 31 of the plunger shaft 30.

The shaft 30 is mounted for vertical sliding movement in a housing 39 and is connected to and supported by the slidable block 28 at its upper end, Figs. 1 and 2. The block 28 is moved in a horizontal plane in the annular guideway 27 by the housing 39, which is integral with the hub 20. Thus when the housing 39 is moved by the movement of the hub the shaft 30 and the block 28 at its upper end are moved around the axis of the shaft 23. The packing plunger 34 is likewise connected to and supported by the slide block 29, which is likewise caused to move in the guideway 27 when a bracket hub 40 and a lug 41, in both of which the packing plunger is journaled and which are carried by the hub 20, are rotated around the axis of the shaft 23 by the rotation of the hub 20. The hopper 18 as previously described is firmly secured to the hub 20 and movable therewith around the axis of the shaft 23.

The stationary magazine or receiver 38 is provided with six receiving bores 37, as shown in Fig. 1, which are spaced an equal distance apart. The gears 21 and 22 cooperate to rotate the hub 20 intermittently to bring the lower end 31 of the shaft 30 and the lower portion 36 of the hopper successively into registry respectively with two oppositely disposed bores 37 each time the hub 20 is moved. These elements are thus brought successively into alignment with all the bores 37. The lower portion 36 of the hopper thus always delivers plastic material into a bore three bores ahead of the lower end 31 of the shaft 30. The arrangement is such that the plastic material being used is first fed or poured into each bore 37 and then compacted therein by a downward movement of the packing plunger 34 before it is acted on by the plunger shaft 30, so that the material has a chance to be heated during its three steps of movement before it is further compressed by the downward movement and direct compressive contact of the lower end 31 of the shaft 30. Thus there is provided a plurality of compacting and compressing operations on the material which is charged into each bore 37 in order that the voids between the particles may be fully closed and all air or gaseous exudations eliminated. This system of operation on the material permits a constant release in an upward direction of air and gas from the plastic material so that that material at the lower end of each bore 37 is free of all voids and included air or gases.

The downward power stroke of the ram piston 32, or equivalent mechanism, is caused to occur during each alignment of the lower end 31 of the shaft 30 and the lower portion 36 of the hopper 18 with two of the bores 37. Thus the material is simultaneously packed into one bore and further compressed in another. The upward retraction of the ram also occurs during this same alignment, as the lower end 31 of the shaft 30 must be lifted out of the bore 37 before any rotative movement is caused by the gears 21 and 22 to shift the lower end 36 of the hopper and the shaft 30 respectively into alignment with the next set of bores 37.

The magazine or receiver 38 may function either to cool or to heat the plastic material by means of an annular space or conduit 43, which is provided in its wall portion and through which may be circulated a cooling or a heating fluid through inlet and outlet conduits 140, Figs. 3 and 4. Through these conduits cooling or heating liquid or gaseous media may be circulated according to the requiremnts of the plastic material being used. In most instances when using thermo-plastic material, heating by steam, oil, air or other heat conducting fluid is advantageous for softening the plastic material prior to and during the application of compression by the plunger shaft 30.

The stationary magazine or receiver 38 is mounted directly above another similar member 44, which has the same number of receiving bores into which extend bushings 42 preferably of a material neutral to the plastic material such as a chrome nickel alloy. The walls of this member 44 are provided with internal passages 45, through which a suitable temperature controlling fluid may be passed, inlet and outlet passages being provided therefor as indicated at 141, Figs. 3 and 5. Thus the element 44 may be maintained at a different temperature from the element 38, enabling the operator of the device to vary the temperature at different points along bushings 42, which form the inner linings for the bores 37 and thereby to increase or decrease the viscosity of the plastic material used during its preparation for use. This also provides a control of such of the physical changes or chemical reactions of the component parts of the plastic material 19 with one another as are influenced by temperature.

The member 44 is mounted on top of a supply basin 46, by means of screws 41a. The wall 47 of this basin is heated by circulating oil or other fluid heat conducting medium through a space 48 provided therein, the heating fluid entering and passing from the space 48 through conduits 142, as shown in Figures 1 and 3. The purpose is to provide ample and rapid heat control of this particular portion of the apparatus.

Each of the bores 37 extends downwardly into the interior of the basin 46. The lower ends of the bores 37 are turned inwardly toward a supply chamber 49 of the basin, and are formed as minute injector passages 50, through which the plastic material which is consecutively compacted and compressed in the bores 37, is forced radially inwardly into the basin portion of the chamber 49 during each consecutive compressing operation. This material replaces the plastic material delivered from the chamber 49 into a tubular or annular passage 51 when a valve 52 is raised at each period of extrusion of plastic material from an annular orifice 53.

The annular passage 51 is formed between a cylindrical outer wall 54 of an inner nozzle part 55 and a cylindrical inner wall 56 of an outer nozzle part 57. The nozzle parts 57 and 55 have formed therein concentric annular spaces 59 and 58 respectively, provided with substantially cylindrical partitions 61 and 60 respectively, which provide passages for the circulation of a heat conducting fluid downwardly on one side of each partition and upwardly on the other side thereof in each space, Fig. 7. Heating fluid may be supplied to and withdrawn from the space 58 of the outer nozzle part 57 through passages 63, Fig. 1. The outer nozzle part 57 has its upper portion 64 enlarged as shown, Fig. 1, and suitably secured to the lower part 83 of the basin wall 47.

The inner nozzle part 55 is vertically adjustable relative to the outer nozzle part 57 for the purpose of selectively varying the tapered annular space 66, which forms the orifice 53 at the delivery end of the tubular passage 51. This adjustment may be effected by the provision of threaded portions 67 and 68 and a lock nut 69 arranged as shown, Fig. 1, at the upper end of the inner nozzle part 55. Thus there is provided accurate control of the quantities of plastic material discharged from the passage 51 and of the thickness of the tubular plastic wall 70 extruded from the orifice 53.

The bottom wall 71 of the nozzle generally indicated at 65 at the lower end of the inner nozzle part 55 is maintained at such a temperature relative to the plastic material as will insure the separation therefrom of any plastic material which comes into intimate contact with the outer surface 107 thereof. This may be effected by passing a suitable temperature controlling fluid, such as air or water, through passages 72 and a space 97 provided in the lower end of the inner nozzle part 55, as shown in Fig. 7.

In addition, in order to maintain a desired, distinctly different temperature condition in the wall 71, an evacuated space 74 is provided between an inner wall 73 of the heating chamber 59 and a wall 75 defining the inside of the space 74 and also the outside of the passages 72, Figs. 7 to 14 inclusive.

The space 74 may also be used for cooling or heating if it is needed for either of these purposes, but in its contemplated use it serves to separate the positively heated zone within the passage 51 from the cooled or neutral temperature zone established in the passages 72 and the space 97 for controlling the temperature of the wall 71 and retards transfer of heat from the heated zone to the cooler zone except adjacent to the annular space 66 of the orifice 53. At this point conduction of heat occurs through a wall portion 76 to a contiguous wall portion 77 of the bottom wall 71, thereby slightly lowering the temperature directly at the inner wall of the orifice 53, or vice versa if the space 74 is supplied with a heating fluid.

The lower end 78 of the outer nozzle part 57 is also slightly reduced in temperature due to heat losses by conduction and radiation. This condition is advantageous for slightly increasing the viscosity of the skin of the annular body of plastic material as it is extruded, thereby increasing within limits the support given to this extruded annular body at the point of its release from confinement within the nozzle 65.

The valve 52, which is arranged to seat in a recess 82 formed in the basin wall 47, has an upper sleeve body 79, which is raised or lowered to open or close an opening 124, Fig. 4, at the valve seat by means of an eccentric part 80, Fig. 3, which engages projecting portions 81 of the sleeve body 79.

The valve 52 is twice raised from the recess 82 and lowered during the making of each article. The first vertical reciprocation, occurring during the pressure molding of the bottom wall portion 114 of the desired article, is followed in quick succession by a second reciprocation of the valve for the extrusion of the tubular wall 70. During this period there is a sustained movement of the plastic material from the passage 51. The period of time during which the valve is open, the degree of opening of the valve, the speed of movement of the valve and the pressure effective on the plastic material will determine or insure a selected rate of discharge of the plastic material from the supply chamber 49 to and out of the passage 51 of the nozzle 65.

If the opening 124 of the valve 52 is very narrow, a smaller quantity of the plastic material under the pressure established in chamber 49 will be discharged in a given time than if the opening is made larger by a greater opening movement of the valve.

The upper portion of the chamber 49 provides a space 84 for a suitable compressed gaseous medium, which is introduced into the chamber through a conduit 122, Fig. 3. The pressure exerted by this gaseous medium on the semi-fluid supply body 131 of plastic material in the lower portion of the chamber 49 serves primarily to control the quantity of the plastic material discharged from the chamber when the valve 52 is lifted. The amount of pressure needed for extrusion from the chamber 49 through the valve opening 124 and the passage 51 of a portion of the plastic body 131 varies considerable with the different materials. Some plastic materials, which are relatively fluid, may require only 25 to 50 pounds per square inch on the surface 123 of the material to cause a desired discharge thereof through the passage 51 of the nozzle.

However, the desired rate of discharge of any plastic material from the orifice 53 under certain permissible temperature conditions and influenced by the valve control provided as aforesaid will determine the magnitude of the pressure required in the space 84 in the upper portion of the chamber 49. Different pressures can be employed in the chamber 49, such pressures for less mobile plastic materials possibly exceeding 500 pounds per square inch.

In order to regulate the quantity of plastic material discharged or the extension of the tubular form thereof being extruded within a given period of time, the required pneumatic pressure therefor is first determined. When this is done, the effect of the pneumatic pressure in controlling the lineal speed of advance of the tubular wall 70 at the orifice 53 is accurately regulated by the predetermined size of the annular opening 124 provided when the valve 52 is raised from its seat in the recess 82. Accordingly, positive and accurate control of the movement or the variations of movement, the stop periods and the position of the valve 52 relative to the seat 82 are of importance.

Means are provided for the control of the valve 52, Fig. 3, comprising an arm 85, which is actuated by a rod 86 to turn the shaft 87 around its axis. On the inner end 88 of this shaft is provided the eccentric part 80, which co-acts with the portions 81 of the sleeve body 79 to raise and lower the valve 52. Any suitable cam or other mechanism (not shown), preferably of an adjustable kind, may be provided for actuating the rod 86 to move the arm 85 a suitable distance with any predetermined speed or stop motion as will insure the required slow, varied or rapid lift or downward movement of the valve 52, the distance of such movement in either direction, the time period that the valve 52 remains in its lifted position and the period during which it is seated in the recess 82.

The pneumatic pressure in the space 84 of the chamber 49 may also be pulsated or recurrently varied to provide desired pressure conditions required for the efficient discharge of a plastic material in fluid condition, these variations occurring each time the valve 52 is actuated, or before each actuation. In this connection, when relatively low pressures are used, a partial vacuum may be recurrently established in this space 84 instead of positive pressure to operate for or assist in the removal of air or gas included or generated in certain kinds of plastic materials. Vacuum in the space 84 may also be intermittently applied for retracting the plastic material in the passage 51 from the vicinity of the orifice 53 between each pressure application for the extrusion of the plastic material. The object of this operation is to preserve the desired condition of fluency or viscosity of the plastic material by bringing it to a zone of higher temperature than that at the orifice 53 due to certain temperature losses thereat, as previously set forth.

Heating fluid for controlling the temperature of the wall 54 of the inner nozzle part 55 is introduced through a conduit 89 and removed through a conduit 90 at the upper end of the inner nozzle part 55, Figs. 1 and 4. The fluid passes through a channel 91 in a distributing part 92, thence downwardly on one side of the partition 61 and upwardly on the opposite side thereof in the space 59 indicated in Fig. 7. The temperature of this fluid will normally range from 250 degrees F. to 400 degrees F. or more for thermo-plastic materials which are made fluent or become semi-fluent or mobile under pressure at such temperatures.

The vacuum established in the space 74 is maintained through a cover 93 and a tubular connection 94 leading to a vacuum pump or other air exhausting device (not shown). This cover 93 has an air tight seal with the top of the part 92.

Above the cover 93, Figs. 1, 3 and 4, is located a partitioned hollow head piece 95 provided with inlet and outlet conduits 96, through which a cooling or temperature controlling fluid is caused to move downwardly through two of the passages 72 to the bottom cavity 97 at lower end of nozzle part 55, whence the fluid moves upwardly through another pair of the passages 72, there being four of these passages as indicated in Fig. 3.

Figure 11:
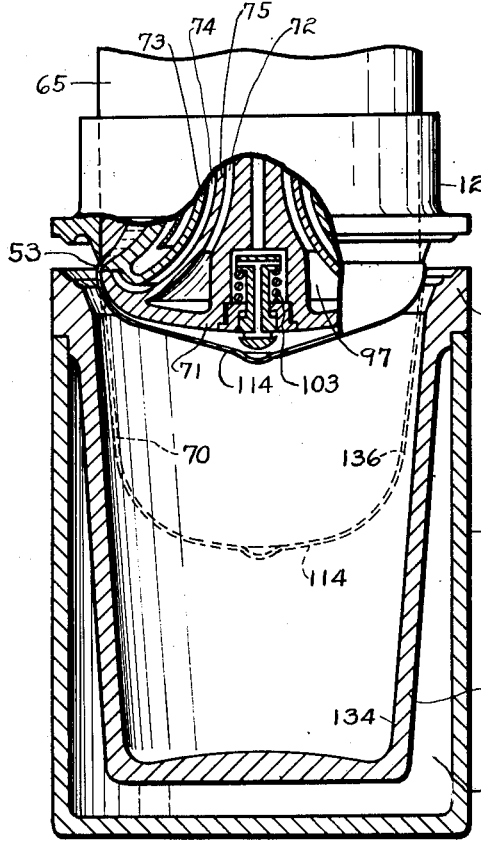
Fig. 11 is a fragmentary view partly in elevation and partly in central vertical section showing the molded bottom wall-forming portion for a tumbler or container released from the cooled lower end surface of the nozzle and also in dotted lines, the side wall portions being extruded with the bottom wall and moving downwardly into the shaping mold.

The air for blowing the plastic material and for other uses at the lower end of the nozzle is introduced thereto through a tube 98, which passes downward through the central portion of the head piece 95 and is held by a lock nut or gland member 99. The air passage 100 of the tube 93 terminates centrally above the bottom wall of the nozzle, at which point is located an air valve 101 provided with a downwardly protruding, rounded head 102. This air valve is urged toward its retracted or closed position by a compression spring 103. When air under pressure is admitted to the passage 100, the force of the air will compress the spring 103, thus permitting a flow of the air sequentially through bores or spaces 104, 105 and 106, Fig. 15, the air escaping tangentially of the lower surface 107 of the wall 71. As this takes place, the head 102 of the valve 101 is moved downwardly a short distance as shown in Fig. 11.

One step of the process of this invention is to form the bottom wall portion or that wall which comprises the bottom end of a hollow article, bottle, or container before the other wall portions are formed. This is accomplished by a modified form of pressure injection molding in which a cup mold 108, Figs. 8, 9 and 10, comprising two mold halves 109 and 110, is used in connection with the surface 107 of the wall 71. A space 115, Fig. 9, between the surface 107 and the inner surface 111 of the mold 108 is arranged to form the wall portion 114 for the article when the mold 108 is in the position shown in Fig. 9, at which time the halves 109 and 110 of the mold 108 are tightly locked around the lower end of the nozzle, there being an air tight contact between the peripheral portion 127 of the cup mold 108 and the lower portion 128, of a cylindrical cutter 126.

The mold 108 is held at a suitable relatively low temperature by the circulation of a cooling or other temperature controlling fluid through spaces 112 and 113 provided respectively in the mold halves. The purpose of this is to reduce the temperature of the wall 114 of plastic material, which is deflected from the orifice 53 into the space 115 and molded therein. This reduction of temperature does not proceed very far, but is sufficient to render the wall portion 114 properly cohesive in its exterior surfaces while being otherwise softly plastic and somewhat extensible.

In this connection it should be noted that compounds such as cellulose acetate molding compositions will vary considerably in their thermoplastic properties or viscosity characteristics. For this reason it should be understood that the molding surfaces 107 and 111 should be kept at such temperatures relative to the soft plastic material injected therebetween in the space 115, so that only a small portion of the heat will be taken away from the wall 114 of the plastic material just enough to prevent adhesion of the external surfaces of this wall to the surfaces 107 and 111. Thus, the "cooling" of the cup mold 108 and of the wall 71 in reality may be a degree of heating in respect to normal temperatures. The temperature of the "cooling" fluid should be carefully controlled so as to permit just enough "cooling" to insure the release of the wall 114 from the surfaces 111 and 107. Also, the time period allowed for withdrawing heat from the wall 114 is of necessity very short.

The cup-hold portions 109 and 110 are preferably made of nickel, chrome-nickel or Monel or similar alloys. Each mold part is carried by an arm 116, Fig. 10. The arms 116 are carried by a vertically reciprocating support and actuated by mechanisms which open and close the mold parts, all of which is accomplished in predetermined sequence, these mechanisms not being shown.

A forming mold 144 for a tumbler 143, Fig. 7, is formed of an inner shell 118, and an outer jacket 117, an intermediate space 119, being provided for cooling or heating the inner shell 118. The fluid cooling or heating media therefor are introduced and withdrawn through conduit openings 120 and 121.

In the making of articles several molds are preferably provided, which are successively brought into registry with the nozzle 65 and the cutter 126 in the manner herein indicated, none of the mechanisms for the moving of the molds vertically or horizontally being herein shown.

In operating the apparatus, the granular or shredded material 19 should first be freed from moisture or be in a satisfactory dry condition, for which reason air conditioning is advantageous. Before introducing the granular material into the hopper 18, it may advantageously be heated to a point where it will become tacky or adhesive before it is used.

When the hopper is charged with a batch of the material 19, the various elements comprising the receiving and containing portions of the apparatus have received prior heating according to the requirements of the material to be used.

Cellulose derivative compounds will generally require from 250° F. up to 390° F. according to the composition and percentages of resins or plasticisers or both and also according to the particular composition of the cellulose derivative. Materials such as polystyrene, styrol or vinyl resins of different kinds, which are formed by combining different materials under the different conditions of treatment, such as vinyl acetate, vinyl acetaldehyde, vinyl chloride and vinyl-formaldehyde compositions are capable of softening at lower temperatures. Compounds or other compositions of vinyl resins with other thermo-plastic materials, or with plasticizers, or with numerous condensation products or materials made by polymerization or otherwise have different viscosity characteristics and working temperatures varying usually from about 200° F. up to 400° F. The purpose in any case is, however, to bring the material chosen for use to the desired conditions to carry out the process herein disclosed. The pressure needed for preliminary fusion of many materials to produce a soft flowable material also vary considerably and must be coordinated with the other factors, particularly temperature, in accordance with the characteristics of the material being used.

At the time the hopper 18 is charged, the lower open end 36 thereof is in alignment with one of the bores 37 in the magazine 38. The granular material 19 will then run or flow downwardly into the lower portion of the bore 37. Immediately following this, the operations of the device are started beginning with the ram piston 32, which imparts a quick downward movement to the shafts 30 and 34. The shaft 34 inside the hopper 18 drives downwardly against the material in the hopper portion 36, causing the material which is below the end portion 35 of the shaft 34 to become compacted with the material already received in the bore 37.

At the time of starting the operation, the compression plunger 30, is depressed into an empty bore 37 at the opposite side of the receiver or magazine 38, the dotted lines in the bore 37 at the left of Fig. 1, indicating the distance of downward movement of the shaft 30, while the bottom line of the hopper indicates the distance of movement of the lower end 35 of the plunger shaft 34.

These downward movements are followed by an upward retraction of the shafts 30 and 34, the upper ends of which are held in the blocks 28 and 29 respectively, and are thus lifted upwardly when the ram parts 24 and 26 are elevated. At a time when these shafts are at the upper ends of their paths of movement, the hub 20 is given a partial rotation through an angle of 60 degrees or one sixth of a complete rotation by the gears 21 and 22, thereby moving the shafts 30 and 34 and the slide blocks 28 and 29 a distance of 60 degrees in the guide way 27 and thereby locating the opening 36 of the hopper 18 as well as the lower end 31 of the shaft 30 respectively over another pair of bores 37.

The material 19 will now immediately run down through the opening 36 into this aligned bore 37 filling said bore with the material in the same fashion as previously described. These preparations described are continued until all the bores 37 have been charged. However, after a third bore 37 has been charged, the compressive action of the plunger end 31 on the material commences as this shaft end reaches the bore 37 which was first charged with the material 19 as previously described.

As the ram piston 32 depresses the shaft 30, the lower end 31 thereof enters the previously filled bore 37 and contacts the partly compacted material 19 therein, which has been softened by heat, further compressing the material and packing it downwardly toward the lower portion of the bore 37. When this plunger end 31 is withdrawn, a space 145 is provided in the bore 37 for receiving another charge of material from the hopper 18.

As the hopper end 36 reaches the bore 37 which was first charged as aforesaid and in which the charge was compacted, an additional charge of the material 19 is packed down in this bore, which procedure is repeated in each successive bore. During this successive or intermittent packing down of the material, it gradually becomes softer and increases in density. Consequently there is provided better heat penetration, so that when the plunger end 31 is again driven downwardly into the material in the successively presented bores 37, the material starts to merge, fuse, coalesce or flow. After a plurality of the filling and packing operations followed in each instance by a compressing action of the plunger end 31, the material in the lower end of each bore 37 and particularly at the ejection opening 50 thereof is converted to a compact, partly liquefied body, which will flow under the conditions of heat and pressure present and will pass from the small slotted opening 50 into the basin portion of the chamber 49. Each charge so delivered is a measured quantity equal to the quantity required to be extruded from the supply body 131 in the making of a single article. The length of the downward movement of the ram and plunger shafts is made adjustable in a suitable manner (not shown) to vary the amount of material thus delivered by each stroke.

The successive steps of compacting and compressing the material under the influence of the heat provided, will gradually eliminate all voids or pockets of air or gas in the material present in the lower ends of the six bores 37. This material is forced successively in series of streams 130 of minute cross section from the orifices 50 into the chamber 49, where an accumulation of the stream injections builds up and maintains a supply body 131 in the annular chamber 49. This supply body, depending upon the nature of the material used, may be a semi-fluent body, or may be fluent in the sense of a very thick liquid of high viscosity, or be like a cohesive paste having partial fluency.

It should be noted that the several streams 130 are injected into the supply body 131 at successive intervals from each of the six equally spaced minute orifices 50 and that during the replacing of the annular supply 131 the streams 130 are injected adjacent to the upper surface 123 of the supply body, Figs. 4 and 5.

The object of this is to insure that the preceding material forming the supply body 131 will be progressively used or delivered from the supply before any material part of the subsequently added material is used. Thus at no time there will be present in the chamber 49 and in the supply body 131 any material which will remain therein for a long period; but all of it will pass out rapidly through the passage 51.

The six point peripheral replenishment of the supply body 131 by the freshly homogenised and fluent plastic material is productive of a uniform condition of viscosity within the supply body 131, thereby insuring a uniform cohesiveness and viscosity for the material forming the entire supply body, so that it will respond uniformly at all points to any pressure applied. The ability to move the material, under pressure at a uniform linear speed through the tubular passage 51, also follows from the six point feed to the supply body 131 and from the uniform heat delivery thereto. The downward discharge of the plastic material from the lower portion of the supply 131 through the annular exit opening 124, Fig. 4, into the tubular passage 51 will, after this passage 51 has once been charged from the supply body, displace the material already in such passage and cause it to extrude from the annular orifice 53, Figs. 9, 11 and 13.

As previously described, the walls surrounding the tubular or annular passage 51 are also adequately heated, so that the fluent or semi-fluent plastic material in the passage 51 will not loose any of the properties imparted to it as aforesaid, but will remain soft or fluent. Consequently this material may be extruded with a uniform cylindrical stream line flow at all points under the pressure applied thereon from the material of the supply body 131, and will extrude from the orifice 53 with a uniform speed at all points and with a uniform wall thickness. In this connection it should be noted that the entire amount of material in the basin portion of the chamber 49 and in the passage 51 is enough to make 8 or 10 of the tumbler type vessels 143, shown in Fig. 7. For each compressive operation the shafts 30 and 34, sufficient of newly liquefied material is fed into the supply body 131 from one of the bores 37 to replace the material used in the making of one complete article. Exactness in this respect is made possible by adjustment as between the ram and the shafts 30 and 34. To vary the distance said shafts shall move in actually compressing the material.

The rapid movement of the material through the apparatus prevents prolonged heating after the material has been rendered sufficiently soft for use as herein set forth. This will prevent chemical or physical changes in the material and retard the changing of color, thereby enabling the repeated use of the material. That is, any molded vessel which has been used may subsequently be cleaned and granulated, shredded or otherwise restored to a finely subdivided condition and then used over again for making the same or any other article which may be molded, blown or otherwise formed according to the present disclosure or modifications thereof.

In a sense, therefore, the plastic material, comprising the annular supply body 131 and the plastic material in the annular passage 51 may be said to be in a constant state of pulsative motion and forms a maintained but constantly changing body, which takes in a quantity of the material as an addition at one end and then delivers the same quantity outwardly from the other end.

The production of any container or vessel according to this process requires that the bottom wall portion of the vessel be the first portion produced and that thereafter the side walls and the mouth portion of the container be formed.

In the forming of the bottom wall 114 of an article, as previously mentioned, the split mold element 108 is used which provides the molding surface 111. This surface 111 and the surface 107 of the wall 71 define the bottom wall molding space 115.

Immediately following the making of a tumbler or any other hollow article as shown in Fig. 7, the cylindrical cutting member 126 is positioned as shown in that figure. The mold 144 is moved out of the way by any suitable mechanism (not shown). The cup mold 108 at this time is about to be elevated to expose the orifice 53, as shown in Fig. 9, the upper peripheral portion 127 of the mold engaging the lower part 128 of the cutter 126. The mold 108 is thus accurately positioned relative to the annular orifice opening 53 and the wall 71.

At this time the valve 52 in the chamber 49 is raised for a predetermined time and then lowered to its closed position, so that the fluent plastic material of the supply body, moving under the influence of the pneumatic pressure within the space 84, will be forced through the passage 51 and from the opening 53 into the aligned space 115 to fill this space.

As the fluent plastic material is forced into the relatively cooler environment defined by the surfaces 107 and 111, the temperatures of which are controlled as aforesaid, the wall 114 is formed, any air present in the space 115 being forced out and prmitted to escape through the customary vents provided. The surfaces of this wall 114 are now changed from a fluently adhesive condition to a non-adhering condition relative to the surfaces 107 and 111, sufficient heat being withdrawn by the molding members from the exterior of the wall 114 to form a toughened skin thereon.

At this time air under pressure is admitted to the tube 98 and flows through the passage 100, while simultaneously the mold parts 109 and 110 of the mold 108 are opened and withdrawn from the vicinity of the molded bottom wall 114, the relative positions of the parts being about as shown in Fig. 10.

Coincident with this, but a fraction of a second later, the accumulated air pressure in the passage 100 will cause the head 102 at the lower end of the valve 101 to move downwardly as shown in several figures, exposing the air passage 106, Fig. 11, and admitting low pressure air between the inner surface of the plastic wall 114 and the surface 107 of the wall 71, this air being delivered tangentially along the wall 71, thus separating the film wall 114 from the lower end of the nozzle.

During the separation by air pressure of the plastic wall 114 from the wall 71, the valve 52 is again raised and held in a raised position for a short predetermined period, thus permitting the extrusion of a freely suspended annular wall 70 from the material in the passage 51 through the annular orifice 53. The bottom wall 114, which is an integral part of the extruding tubular wall 70 is meanwhile moved in air pressure as shown by the dotted lines in Fig. 11.

During the operations thus far described, the cutter 126, Fig. 1, is held in an elevated position by its supporting arm 133, its position relative to the orifice 53, being as shown in Figs. 9, 10, 11, 12 and 13. The mold 144 may be positioned as shown in Fig. 11 during this portion of the process and during the forming of the bottom and side walls of the article. Alternatively the mold may be elevated so that the upper part 129 thereof will engage the lower end 128 of the cutter 126, in which case the cutter must be located in an elevated position as shown in Fig. 9, so as not to obstruct the uniform movement of the plastic material from the orifice 53.

The actual period of time required to extrude and lay a completed plastic wall 70 in the cavity of the mold 144 may be less than one half a second, but a longer period of time may be used during which the tubular wall 70 and the bottom wall 114, which together form a hollow blank 136, will be positioned about as shown in Figs. 12 and 13. The low super atmospheric air pressure within the blank 136 serves to keep the plastic walls 70 and 114 properly tensioned and distended.

At this time the pneumatic pressure in the space 84 of the chamber 49, acting on the plastic material in the passage 51, is reduced to a point insufficient for extrusive purposes; or the valve 52 may be lowered to close the opening 124 at the seat 82, thereby severing or cutting off the pressure connection between the supply body 131 and the plastic material in the passage 51, the result in either case being that the discharge of plastic material from the orifice 53 is stopped.

The cutter 126 and the mold 144 are then brought into sealing contact, as shown in Figs. 14 and 15, and the air pressure in the passage 100 is increased, so as to force the plastic wall 70 of the blank 136 against the inner face of the mold cavity 134 to give the desired shape to the plastic material. At the same time the cutter 126 is given a downward movement by the arm 133, so that the annular cutting edge 146 of the cutter will move across the orifice 53 and through the plastic wall 70 at that point.

After the knife edge 146 has cut through the plastic material at the upper end of the tubular wall 70, Fig. 14, the cut end at the upper edge of the article is forced outwardly by the face 147 of the knife edge 146. As the cutter 126 moves downwardly and the part 128 of the cutter meets the part 129 of the mold, the upper end of the wall 70 is press-molded into the desired shape to form a lip or rim wall 148 and a bead edge 149 by cavities 150 and 151 and a flaring surface 152.

During these operations, a higher air pressure is admitted to the inside of the hollow plastic blank 136. When the final shaping of the upper end of the wall 70 is completed, the air pressure is reduced to normal and the mold 144 is then lowered from contact with the cutter 126, as shown in Fig. 7; after which the mold with the finished article therein is moved away from the charging position, preferably by a downward and lateral movement.

The inner shell 118 of the mold is normally cooled by the circulation of cold water through the space 119. Such cooling tends to shrink the wall 70 of the tumbler 143, so that it will normally draw away or be readily disengaged from the surface of the mold cavity 134. The molded article may thus be removed by inverting the mold, by suction or by other removal means (not shown).

The operation of blowing or distending the hollow blank 136 by means of air under pressure is indicated in Figs. 11 and 12, and 13, and represents a minimum distending operation. The accompanying drawings illustrate the operations occurring when a minimum pressure is used for blowing the blank 136, such as a pressure of one or two pounds. If instead of the tumbler mold shown, a blow mold for a wide mouth jar is used, the pressure of air required to produce the desired article should be increased so as to provide an increased distending action.

With an extrusion nozzle of less diameter than that herein shown and described, the operations of making both the bottom wall 114 and the side wall 70 are simplified. Thus, as a general proposition, the making of a medium wide or relatively small opening at the mouth of a container, which otherwise may have a larger body diameter, may advantageously be carried on according to this process, for the reason that uniformity of streamline flow is more readily obtained with a smaller diameter tubular hollow blank, the walls of which can be made thicker and thus will stand more lateral expansion. Also, such articles may have smaller bottom portions and are readily formed using low pressures for extrusion.

Instead of making the bottom wall 114 only by injection molding as a portion of a hollow article which is otherwise formed by extrusion and blowing, the entire tumbler herein shown may be produced by forming both the side walls and the bottom wall in one continuous piece by injection molding. In such a case a detachable forming member for the inner side of the tumbler wall is used and suitably attached to the lower end of nozzle 65, while the outer molding part will function the same as the mold 108. The cutter 126, would also have the same use as above set forth, so as to leave a tumbler-shaped space for receiving the plastic material as between the outer and inner molding parts. The cutter 126 might have no reshaping function, but act only to separate the upper wall of the wall of the tumbler from the orifice 53.

Such pressure molding or casting of an entire article is within the intended scope of my present invention. The only appreciable change in apparatus required for good results from a production angle is that each mold be equipped with an inner detachable molding member for the inner side of the tumbler and that this member be suitably attachable and detachable, so as to be made a part of lower end of the extrusion nozzle prior to each molding operation. The process requires that the inner molding member must then be held in positive pressure contact with the plastic material forming the wall body of the tumbler before it is withdrawn and the article released from any of the molding parts.

The difference between the type of pressure molding herein disclosed and the present day injection molding, resides in this, that the plastic material is not injected in a stream of small cross section through a very small orifice into a large area of molding space between cool mold parts, which requires a high pressure on the plastic material, normally around ten thousand pounds per square inch, in order quickly to drive forwardly a sufficient quantity of the plastic material to form the article, but as herein practiced the plastic material is delivered in a stream of relatively large cross section through an annular space forming an orificial exit, preferably of larger area than the space into which the plastic material is to be injected, which eliminates the need of great pressure and saves considerable time.

Also when practicing injection molding in the way I have outlined, the surfaces of the mold parts are not cooled to the same extent as in the high pressure, small orifice injection practice, but on the contrary the mold parts may be heated, particularly in the making of an entire tumbler by injection. This is advantageous in thereafter permitting a gradual cooling of the plastic material for producing articles without any warping of the walls or subsequent deformities. In this connection by gradually lowering the temperature of the mold parts, all sudden chilling is avoided and the plastic material is annealed and sets to a rigid state without strains or stresses.

In the practice of the process, certain materials should preferably be slightly heated before being poured into the hopper 18 or into the bores 37. This preliminary heating is an aid in speeding up the conversion of the material from a rigid to a plastic state. The period of time the material in the several bores 37 is exposed to heat before and after each compression of the material is important in controlling the progressive heating of the material quickly to convert it to a soft plastic or semi-fluent state at the rear of the minute orifices 50 in the lower end of each bore 37. The pressure generated at the rear of the orifices 50 is relatively high and of itself produces considerable heat in the material, serving to reduce the viscosity thereof. As the material has been preheated, it is quickly fused and/or rendered fluent at the rear of each orifice 50; so that in reality the material is in a molten or more or less plastic, cohesive, viscid or fluid condition depending upon its nature or composition, prior to its extrusive flow through the orifices 50 into the supply body 131.

The normally relatively low pressure which is applied constantly or intermittently above the plastic body 131 in the chamber 49 will not cause any appreciable back-flow through the orifices 50 into the lower ends of the bores 37 for the reason that the material is tightly packed in each bore 37.

The annular valve or stopper 52, which closes the annular opening 124 between the supply body 131 and the material in the passage 51, is effective in quickly arresting exudation from the orifice 53.

Reduction of pressure in the chamber 49 may also be employed to aid in obtaining a resurging or retrogressive action of the plastic material in the passage 51, so that the cut end of the tubular plastic body at the orifice 53 is withdrawn within the nozzle into an environment of higher temperature and thus is kept more fluent.

The cutter 126 may be cooled by an air blast (not shown) or may be internally cooled by the circulation of a cooling fluid through its walls in a manner not shown. However, in the present instance the intermittent contact with the cooled upper end of the cup-mold 108 and with the cooled mold 144 is sufficient to keep the knife edge 146 at a proper operating temperature and to avoid the adhesion thereto of plastic material.

The adjustability between the nozzle parts 55 and 57 is useful for regulating the frictional resistance effective on the material incident to its extrusion from the passage 51 and also for predetermining the thickness of the extruded wall 70.

Very thin hollow film bodies may be extruded from the orifice 53. Such bodies may be kept from collapsing by means of low air pressure delivered within the extruding hollow body. The adjustment of the width of the annular slot 66, which defines the annular delivery opening at the orifice 53, determines the thickness of the extruded wall of plastic material.

The air used for expanding the hollow tubular envelope or the hollow bag-shaped body, which is herein referred to as a hollow blank, may be cooled or heated as required for different plastic materials, some of which are set or hardened by heat or by pressure or both.

For the present purpose the air or gas used for expanding the hollow blank may be cooled and two different pressures are used, a low pressure up to two pounds for gradually expanding the hollow plastic body or blank 136 and for affording internal support thereto and a high pressure up to 25 pounds, more or less, for pressing the wall of the blank against the surface of the mold cavity 134.

The use of heated air during the expansion of an extruding hollow blank is advantageous for retaining the plasticity in the blank. The heat which is transmitted to the thermo-plastic material from the several members 38, 44, 46 and 65 should preferably be varied. For instance, with a compound containing four parts of cellulose acetate, one part sulphonamide formaldehyde, or phenolic type resin and one part of a plasticizer such as methyl-ortho-benzyl-benzoate, which latter acts as a solvent for cellulose acetate when heated, the temperature of the member 38 may be held around 250 degrees F.

The temperature of the member 44 may be held at 370 degrees F.; the basin wall 47, at 350 degrees F.; and the inner and outer walls of the nozzle 65, at temperatures varying from 275 to 325 degrees F. The object of these variations of temperature is that at 250 degrees F. the granular material in each bore 37, which is in direct contact with the plunger parts 31 and 35, will not take on enough heat to become adhesive at the points of contact with said parts, while lower down in each of the bores 37, it is urgent that enough of heat be present so that the plasticisers and resins, which are intimately mixed with the cellulose compound, will become liquid and acquire their solvent power and thereby disperse the cellulose into a soft pasty or semi-liquid condition for quick movement under pressure from the orifices 50 and thereafter through the annular space 124 when the valve 52 is raised. When the plastic material is released into the passage 51, it is desirable gradually to reduce the temperature effective thereon and thereby to increase its viscosity or rigidity and also to stop any chemical action which might take place therein as the pressure acting thereon is reduced. However, it should be noted that a higher temperature of the material in the passage 51 tends to reduce frictional resistance.

The bushings 42, which function as liners for the bores 37, also act to defuse and blend the heat of the different members. With the member 44 heated as previously described, the lower end of each bushing 42 will be relatively hotter than the upper end thereof and the material will gradually be raised to this higher temperature as it moves toward the lower end of the bushing and thus gradually increase in plasticity, softness and degree of fluency while entering that portion of the bore 37 which is heated from the wall 47 of the basin 46. With regard to the relative cooling or heating of the wall 71 at the lower end of the nozzle part 55 for the purpose of having a cooling or heating influence on the surface of the plastic wall 114, the several passages 72 leading to and from the pocket or space 97 permit accurate control of the surface temperature of the plastic material for obtaining an easy release of the wall 114, or for reducing or maintaining the contained heat, or for increasing such heat within the plastic wall portion.

With some more readily softened compounds or thermo-plastic materials such as ethyl or benzyl cellulose, which become plastic and may be extruded at lower temperatures, the heating of the different members may be varied or reduced. The member 44 may be kept at the same or at a lower temperature than that of the wall 47 of the basin 46. However, the actual temperatures to be used and the heat to be transmitted from any or all the parts 38, 44, 46, 55 and 57 depend upon the plasticity or viscosity characteristics of the basic materials used or the compounds or mixtures of such materials with different resins and plasticisers.

While the process herein disclosed is primarily suited for thermo-plastic materials, there are other more or less similar materials having some thermo-plastic characteristics, such as resins produced from rubber, natural gums and various hydrocarbons, which by themselves or in combination with other materials will be satisfactory for the production of articles as outlined herein.

Materials such as casein plastics and various combinations thereof with other materials can be converted into cohesive pasty solids from which articles can be produced according to this process. I do not wish, therefore, to be limited as to materials except that the material selected must be one suitable for use.

The present application is a continuation in part of my applications Serial Nos. 658,486 and 16,864, filed Feb. 25, 1933, and April 17, 1935, respectively.

Having thus described my invention, I claim:

1. The process of forming articles from thermoplastic material, comprising the steps of heating and pressing and then extruding the plastic material from the outlet of a tubular conduit into an adjoined mold space between upper and lower molding faces to produce a transversely extending plastic wall which is integral with the parent body of plastic material in the said conduit, then extruding a tubular shaped wall from the plastic material in the said conduit, the lower end of which wall is integral with the said transverse wall and forms therewith a hollow tubular blank, expanding said blank into pressure contact with the formative faces of an open ended mold cavity to shape the blank to the form of the article to be made, and thereafter effecting a severing cut through the wall material adjacent to the outlet of the conduit in such a way as to produce a finished upper edge on the article.

2. The process of claim 1, including the additional step of dislodging the said transverse wall from its upper molding face by introducing air therebetween as the said tubular wall is to be extruded.

3. The process of claim 1, including the additional procedure of lowering the temperature of the surface layers of the said transverse wall to reduce adhesion thereof to the said molding faces.

4. In the making of individual articles from organic plastic material of a cohesive nature, the process which comprises providing a discharging supply body of such material in a flowable plastic state and in a quantity sufficient for the making of several of said individual articles, intermittently discharging at regular successive intervals predetermined quantities from said body and forming an article of hollow form from each of said quantities, and intermittently replenishing said body by adding thereto at successive regular intervals each of which is equal to one of the first named intervals additional fluent material in quantities each equal to one of those discharged to form an article.

5. The process of making hollow articles from organic plastic material which is expansible by blowing and thereafter capable of being rigidified, which comprises providing a supply body of such material in a flowable plastic state, forcing a portion of said supply body into the space defined by molding surfaces to form the bottom wall portion of a hollow article, and thereafter extruding the side wall portions of such article from said supply body in tubular form while said bottom wall portion first formed remains integral with said supply body.

6. In the handling of heat-sensitive, organic plastic material for molding, the process of converting a solid material of this type which is in a subdivided state into a cohesive semi-fluent body which will flow under pressure, comprising progressively and intermittently at regular intervals compacting successive quantities of said material and progressively increasing the application of heat thereto, compressing and further heating said quantities to render them cohesively plastic and fluent under pressure, co-mingling a succession of portions of the fluent quantities into a semi-fluent plastic body, intermittently adding to said body fluent streams of the material by injection under pressure, surrounding said body with a zone of heat to maintain the fluency factor in the material, subjecting the said body to variations of pressure, and intermittently discharging therefrom at regular intervals measured portions for molding.

7. The process of shaping articles from heat-sensitive organic plastic materials, which are expansible by blowing and thereafter capable of being rigidified, comprising fusing such a material by successive applications of heat and pressure until a fluently plastic condition is attained, forming a supply body of the fluent plastic material so treated and a confined annular body thereof as a continuation of said supply body, intermittently advancing a portion of the supply body into said annular body and simultaneously moving forward a portion of said annular body and shaping a closing wall thereof at the forward end of the annular body, then applying pressure on said supply body to advance an unconfined tubular wall with said closing wall across its forward end and integral therewith and thereby forming a hollow blank extending from said annular body, during the extrusive advance of said blank admitting air thereinto under predetermined controlled pressures, first, to establish predominance over outside pressure and, second, to press the wall of the blank into the shape of a mold cavity for forming the required article, and thereafter severing the wall of the article thus formed from said confined annular body.

8. Apparatus for forming blown hollow articles from organic plastic materials which are expansible by blowing and thereafter capable of being rigidified, which comprises means for converting such a material from an initial solid condition to a semi-fluent or plastic condition and for maintaining a supply body of the material in the converted fluent condition, means for discharging the material in tubular form under pressure from said supply body, external shaping means to shape the tubular material thus discharged into a closed-ended, air retaining, tubular bag, means for supplying pneumatic pressure to the interior of said bag to maintain it in a distended condition, and other means for making a container therefrom with an edge formation suitable for retaining a closure.

9. Apparatus for fabricating containers from initially rigid thermo-plastic material which is expansible by blowing and thereafter capable of being rigidified, comprising in combination, tubular holding elements for the material, means for applying heat and pressure to the material inside said holding elements to convert the material to a homogeneous fused condition, a supply basin for receiving the material, said basin having a chamber for containing a compressed atmosphere, means for feeding the fused material under pressure into said basin, means forming an annular exit extending from said basin to an open end and comprising spaced inner and outer heated members of tubular configuration, said inner member being adjustable relative to the outer member for varying the space that forms the annular opening therebetween at said open end, a valve for controlling the communication between said basin and said annular exit, the aforesaid parts being so constructed and arranged that said compressed atmosphere is effective to extrude a tubular wall of the material from said basin through said annular exit when said valve is open, means outside said exit for shaping the foremost portion of the extruding material into a bottom closure wall for the tubular wall which is thereafter to be extruded, and means effective subsequent to the formation of said bottom closure wall and an extruded tubular portion integral therewith for shaping a container from the material thus extruded and for detaching it from the material within said exit at the open end thereof.

10. The process of forming a container from organic plastic material which is expansible by blowing and may thereafter be rigidified, comprising the steps of forming said material into a tubular body, closing one end of said tubular body, extruding the closed-ended tubular body into the position of a mold while applying pneumatic pressure within said body to prevent it from collapsing, and expanding said body when it reaches a predetermined position relative to the mold by increasing the pneumatic pressure therein until the plastic material conforms to the cavity of the mold.

11. The process of forming a container from organic material which is solid at normal temperatures and which becomes plastic and moldable under heat and pressure, comprising the steps of subjecting the material in a comminuted form to both heat and pressure to convert it to a plastic and moldable condition, forming the material thus prepared into a tubular body, closing the outer end of said tubular body, extruding the closed-ended tubular body into the position of a mold while applying pneumatic pressure within said body to prevent it from collapsing, and expanding said body when it reaches a predetermined position relative to the mold by increasing the pneumatic pressure therein until the plastic material conforms to the cavity of the mold.

12. The process of converting solid organic material into hollow articles, which comprises subjecting the solid organic material to heat and pressure to convert it into a fluid plastic and moldable state, then shaping the material so prepared into a closed-ended tubular form while confining it against lateral movement, extruding the tubular form from confinement while admitting air into the interior thereof to prevent the collapse of the closed-ended tubular form being extruded, and then, by air under relatively higher pressure, expanding and distending the closed-ended tubular form into contact with the confining walls of a mold cavity.

13. The process of working organic material, which at normal temperatures is hard and which is rendered plastic and moldable at elevated temperatures and under superatmospheric pressure, comprising the steps of intermittently applying pressure to the material while progressively applying heat thereto for converting it to a plastic, moldable and substantially fluent condition, and exposing the partly converted material to reduced pressure between the intermittent pressure applications and for permitting the escape of included air and any gases which may be generated in the material during the conversion thereof.

14. The process of working organic material which at normal temperatures is hard and which is rendered plastic and moldable at elevated temperatures and under superatmospheric pressure, comprising the steps of intermittently applying relatively light mechanical pressure to a body of the material in comminuted form and while supplying additional portions of the comminuted material to the portion being compressed, intermittently applying further and relatively heavy mechanical pressure between the relatively light applications of pressure and the supplying of additional portions of comminuted solid material to the portion of material being compressed, progressively applying heat to the material as it is compressed as aforesaid, exposing the material to the atmosphere from the side to which pressure is applied after each application of pressure, to permit the escape of included air and any gases which may be generated during the conversion of the material to a moldable condition as aforesaid, forming a supply body of the material as it is converted to a moldable condition, and passing the material from said supply body to a point of use at which the material may be fabricated.

15. The process of working organic material which at normal temperatures is hard and which is rendered plastic and moldable at elevated temperatures and under superatmospheric pressure, comprising the steps of intermittently applying mechanical pressure to the material in comminuted form while progressively applying heat thereto for converting it to a plastic, moldable and substantially fluent condition, exposing the partly converted material to the atmosphere between the intermittent pressure applications and from the side from which the material is supplied and to which pressure is directly applied for permitting the escape of included air and any gases generated during the conversion of the material, introducing the material, as it is converted to a moldable condition, into a supply body maintained in a confined space, feeding the material from the supply body to a point of use at which the material is fabricated, and controlling the viscosity of the material by controlling the temperature gradient thereof during its entire transition from a solid condition up to the point at which the fabrication of the moldable material is to begin.

16. The process of working organic material which at normal temperatures is hard and which is rendered plastic and moldable at elevated temperatures, comprising the steps of converting the material from a solid state to a fluent, plastic and moldable condition, introducing the material as thus prepared to a supply chamber and there maintaining it in a bath at a selected temperature to maintain the material at a desired viscosity, applying sub-atmospheric pressure over the bath of material in the supply chamber to free it from included bubbles of gas, and passing the material from the lower portion of the chamber to a fabricating point.

17. The process of working organic material which at normal temperatures is hard and which is rendered plastic and moldable at elevated temperature, comprising the steps of converting the solid material to a fluent, plastic and moldable condition, introducing the material as thus prepared into a supply chamber and there maintaining it in a bath at a selected temperature to maintain the material at a desired viscosity, intermittently applying vacuum above the material in the supply chamber for freeing the material from included bubbles of gas, and intermittently applying superatmospheric pressure above the material in the supply chamber intermediate certain at least of the vacuum applications as aforesaid, to cause the material to flow, under the force applied by the superatmospheric pressure, from the lower portion of the supply chamber to a fabricating point.

18. The process of forming articles from temperature-sensitive organic material which at normal temperatures is hard and which is rendered plastic and moldable at elevated temperatures, comprising the steps of maintaining a parent body of the material in a fluent and moldable condition in a supply chamber, controlling the temperature of the material in the chamber to control the viscosity thereof, supplying the material from the chamber through a heated nozzle to a fabricating point, successively fabricating articles from the material adjacent to the discharge end of the nozzle and while the articles successively fabricated remain integral with the parent body of the material in the supply chamber and that in the nozzle substantially throughout their fabrication, successively mechanically severing the articles thus formed from the parent body of plastic material within the nozzle at the discharge end of the nozzle, and, after each severing operation, applying vacuum to the material in the supply chamber so as to cause a retractive movement of the material which has been chilled by the severance as aforesaid into a heated portion of the nozzle for reheating such material.

19. Apparatus for working organic material which at normal temperatures is hard and which is rendered plastic and moldable at elevated temperatures and under superatmospheric pressure, comprising a compression chamber, means for supplying comminuted solid plastic material thereto, a plunger movable in said chamber to apply pressure to the material therein from the end of said chamber to which the plastic material is supplied, means for operating said plunger, means for supplying heat to the material in said chamber, means for relatively moving said chamber and said plunger between the compressive strokes of the latter to expose said end of said chamber to the atmosphere to permit the escape of included air and any gases which may be generated during the conversion of the material to a plastic state under the heat and pressure applied as aforesaid, and passage means communicating between the other end of said chamber and a point of use through which the material may be passed after it has been converted to a plastic and moldable condition.

20. Apparatus for working organic material which at normal temperatures is hard and which is rendered plastic and moldable at elevated temperatures and under superatmospheric pressure, comprising a compression chamber, means for supplying comminuted solid plastic material thereto, a plunger movable in said chamber to apply pressure to the material therein from the end of said chamber to which the plastic material is supplied, means for operating said plunger, means for supplying heat to the material in said chamber, means for relatively moving said chamber and the plunger between the compressive strokes of the latter to expose said end of said chamber to the atmosphere to permit the escape of included air and any gases which may be generated during the conversion of the material to a plastic state under heat and pressures as aforesaid, a supply chamber communicating with said compression chamber and arranged to receive fluent plastic material therefrom, and means for supplying the material from said supply chamber to a point of use at a pressure independent of the pressure used in converting the material to a plastic condition as aforesaid.

21. Apparatus for working organic material which at normal temperatures is hard and which is rendered plastic and moldable at elevated temperatures and under superatmospheric pressure, comprising a compression chamber, a hopper arranged to register at times with said compression chamber for supplying plastic material thereto in a comminuted solid state, a plunger constructed and arranged to move material from said hopper into said compression chamber while said hopper and said chamber are in registry, a second plunger arranged to operate in said compression chamber, alternately with the first named plunger, for further compressing the material therein, means for operating said plungers, means for supplying heat to the material in said chamber, the aforesaid parts being so constructed and arranged that the end of said chamber to which the material is supplied and into which said plungers enter for compressing the material is exposed to the atmosphere intermediate the compressing operations by said plungers for the escape of included air and any gases which may be generated in the plastic material during the compression and heating thereof, and passage means extending from the other end of said chamber to a point of use of the fluent plastic material.

22. Apparatus for working organic material which at normal temperatures is hard and which is rendered plastic and moldable at elevated temperatures and under superatmospheric pressure, comprising a supply chamber for such material after it has been converted to a plastic and moldable condition, means for converting the plastic material from a solid comminuted state to a plastic and moldable condition and for introducing it into the upper portion of said chamber, means for applying vacuum to said supply chamber above the bath of plastic material therein tending to free the plastic material from included bubbles of gas, and means for passing the plastic material from the lower portion of said supply chamber to a point of use.

23. Apparatus for working organic material which at normal temperatures is hard and which is rendered plastic and moldable at elevated temperatures and under superatmospheric pressure, comprising a supply chamber adapted to contain a bath of the plastic material after it has been converted to a moldable condition, means for converting plastic material from a solid comminuted state to a plastic and moldable condition and for introducing it into the upper portion of said chamber, means to apply heat to the bath of material in said supply chamber to control the viscosity thereof, means to apply vacuum intermittently over the material in said supply chamber tending to assist in the release of included bubbles of gas therefrom, and means operating intermittently and intermediate the applications of vacuum as aforesaid to apply superatmospheric pressure to the supply chamber above the bath of material therein to force said material from the lower portion of said supply chamber to a point of use.

24. Apparatus for working organic material which at normal temperatures is hard and which is rendered plastic and moldable at elevated temperatures and under superatmospheric pressure, comprising a supply chamber adapted to contain a parent body of plastic material after it has been converted to a moldable condition, means to convert the plastic material from a solid comminuted form to a moldable condition and to introduce it into the upper portion of said supply chamber, a nozzle through which the plastic material is arranged to be distributed from said supply chamber communicating with the lower portion of said chamber, means to supply heat to the material in said supply chamber and in said nozzle for maintaining the plastic material therein at a desired viscosity, means to discharge the material from said supply chamber and through said nozzle, means associated with said nozzle for severing predetermined quantities of plastic material from the parent body thereof at the discharge end of said nozzle, and means to apply vacuum in said supply chamber above the plastic material therein tending to retract the plastic material in said nozzle subsequent to the severance of each predetermined quantity as aforesaid to prevent the plastic material from hardening at the discharge end of said nozzle.

25. Apparatus for working organic material which at normal temperatures is hard and which is rendered plastic and moldable at elevated temperatures and under superatmospheric pressure, comprising a member having a plurality of compression chambers therein arranged in a circular series, a head positioned adjacent to said member, said head and said member being relatively rotatable, means for relatively rotating said head and said member intermittently in a step by step manner, a hopper carried by said head and arranged to be brought successively into registry with each of said compression chambers for discharging thereinto plastic material in a solid comminuted form, a plunger associated with said hopper and carried by said head but movable in respect thereto in a direction axially of said chambers for forcing comminuted solid plastic material from said hopper into said chambers successively, means to reciprocate said plunger in respect to said head for forcing plastic material into said chambers, means for supplying heat to the material in said chambers, and means for conducting material which has been converted to a moldable condition by head and pressure applied as aforesaid from said chambers for fabrication.

26. Apparatus for working organic material which at normal temperatures is hard and which is rendered plastic and moldable at elevated temperatures and under superatmospheric pressure, comprising a member providing a plurality of compression chambers arranged in a circular series, a head positioned adjacent to said member, said member and said head being relatively rotatable in respect to each other, means for effecting relative rotation between said head and said member intermittently in a step by step manner, a hopper carried by said head and arranged to be brought by the relative rotation as aforesaid successively into registry with each of said compression chambers for discharging thereinto plastic material in a solid comminuted state, a plunger carried by said head and mounted for movement in respect thereto axially of said compression chambers for forcing plastic material from said hopper into said chambers successively and compressing said material therein under a relatively light pressure, a second plunger carried by said head and movable axially of said compression chambers for compressing the material therein under a relatively heavy pressure, means for reciprocating said plungers during the dwells in the relative rotation between said head and said member for feeding material into said chambers and compressing the material therein, said plungers cooperating simultaneously with different compression chambers during each dwell, means for supplying heat to the plastic material in said compression chambers, and means for conducting plastic material which has been rendered fluent and moldable by the heat and pressure applied as aforesaid from said compression chambers for fabrication.

27. The process of forming a hollow article from organic material which at normal temperatures is hard and which is rendered plastic and moldable at elevated temperatures and under superatmospheric pressure, comprising the steps of extruding an annular body of such material in a moldable condition into a molding cavity which is open to be filled around its entire periphery and which is arranged when filled to form a completely closed end for the annular body of plastic material, and controlling the temperature of at least one molding surface defining said cavity in a manner independent of the temperature of the material as it is extruded into the cavity.

28. The process of forming a hollow article from organic material which at normal temperatures is hard and which is rendered plastic and moldable at elevated temperatures and under superatmospheric pressure, comprising the steps of extruding an annular body of such material in a moldable condition into a molding cavity which is open to be filled around its entire periphery and which is arranged when filled to form a completely closed end for the annular body being extruded thereinto, and controlling the temperatures of both surfaces defining said mold cavity independently of the temperature of said material as it is extruded into the cavity and of each other.

29. Apparatus for forming articles from organic plastic material, comprising an extrusion nozzle including inner and outer nozzle members spaced to provide an annular orifice at the discharge end of the nozzle, a mold adapted to be associated with the orifice of said nozzle and cooperating with said inner nozzle member to form a molding cavity communicating with said annular orifice around its entire periphery, means for extruding plastic material through said nozzle to fill said cavity, and means for controlling the temperature of at least one surface defining said cavity in a manner independent of the temperature of the plastic material when extruded thereinto.

30. Apparatus for forming articles from temperature-sensitive organic plastic material, comprising a nozzle including inner and outer nozzle members spaced to provide an annular orifice at the discharge end thereof, a mold adapted to be associated with said orifice and cooperating with said inner nozzle member to form a mold cavity, means for extruding plastic material in a moldable condition through said nozzle to fill said mold cavity, means associated with said nozzle for controlling the temperature of the plastic material during its passage therethrough, means for independently controlling the temperature of the end portion of said inner nozzle member defining the inner portion of said mold cavity, and other means for independently controlling the temperature of said mold, whereby to control the temperature and characteristics dependent thereon of the plastic material subsequent to its having been filled into said mold cavity.

31. Apparatus for forming articles from temperature-sensitive organic plastic material, comprising a nozzle including inner and outer nozzle members spaced to provide an annular orifice at the discharge end thereof, a mold adapted to be associated with said orifice and cooperating with said inner nozzle member to form a mold cavity, means for extruding plastic material through said nozzle and into said mold cavity to fill it, temperature controlling means in said inner nozzle member for controlling the temperature of the plastic material during its passage through said nozzle to said orifice, separate and distinct temperature controlling means for controlling the temperature of the end portion of said inner nozzle member defining the inside of said mold cavity, the two named temperature controlling means being independent each of the other, and insulating means in said inner nozzle member tending to maintain the independence of the temperatures controlled by the two named temperature controlling means.

32. Apparatus for forming blown hollow articles from organic plastic material which is expansible by blowing and may thereafter be rigidified, comprising an extrusion nozzle including inner and outer nozzle members spaced apart at the discharge end of the nozzle to define an annular extrusion orifice, means for extruding plastic material through said nozzle and out of said orifice, means for closing over the end of the annular body of plastic material to be extruded from said nozzle around the end of said inner nozzle member to form a closed-ended hollow body of plastic material, an air passage through said inner nozzle member terminating at the discharge end thereof, and valve means located in said inner nozzle member at the discharge end of said air passage for preventing plastic material from entering said air passage during the closing of the end of the annular body of plastic material over the end of the inner nozzle member, said valve means being further constructed and arranged to open to permit the flow of air from said air passage into the inside of the closed-ended hollow body of plastic material during subsequent operations.

33. Apparatus for forming hollow articles from organic plastic material, comprising an extrusion nozzle including inner and outer nozzle members spaced apart at the discharge end of the nozzle to provide an annular orifice, a mold adapted to be associated with the orifice at the discharge end of the extrusion nozzle and cooperating with the end of said inner nozzle member to define a mold cavity arranged to shape a closing end for the annular body of plastic material within said nozzle, an air passage extending substantially axially through said inner nozzle member and communicating with said mold cavity, and valve means positioned in the end of said air passage to prevent plastic material being filled into said mold cavity from extending into said air passage, said valve means being so constructed and arranged that after said mold has been moved out of its molding position, the valve may be opened upon the passage of air through said air passage to direct the air tangentially of the end of said inner nozzle member so as to strip the end-closing portion of the hollow body of plastic material from the mold-forming end portion of said inner nozzle member.

34. Apparatus for forming hollow articles from organic plastic material, comprising an extrusion nozzle including inner and outer nozzle members spaced apart at the discharge end of the nozzle to provide an annular orifice, a mold adapted to be associated with the orifice at the discharge end of the extrusion nozzle and cooperating with the end of said inner nozzle member to define a mold cavity arranged to shape a closing end for the annular body of plastic material within said nozzle, an air passage extending substantially axially through said inner nozzle member and communicating with said mold cavity, and a spring-pressed, poppet type valve arranged in the end of said air passage and normally closed to prevent the movement of plastic material into said air passage when said mold cavity is being filled by plastic material injected thereinto from said nozzle, said valve being further so constructed and arranged that after said mold has been moved to an inoperative position and upon the supplying of air through said air passage, the valve will be unseated by the pressure of said air so as mechanically to push the portion of plastic material opposite it away from the end of said inner nozzle member, and thereafter air will flow therethrough tangentially of the end of said inner nozzle member to strip the plastic material formed thereagainst from the end of the inner nozzle member.

35. Apparatus for forming hollow articles from organic plastic material, comprising an extrusion nozzle having an annular orifice adjacent to its discharge end through which plastic material may be extruded laterally of the nozzle, means for extruding plastic material through said nozzle, means associated with said nozzle for shaping plastic material extruded therethrough into the form of a hollow article while such material remains integral with the plastic material in said nozzle, and an annular member movable axially of said nozzle subsequent to the completion of the formation of an article to the extent aforesaid and constructed and arranged to sever the article from the plastic material in said nozzle and thereafter to form a lip portion on the orifice.

36. Apparatus for forming hollow articles from organic plastic material, comprising an extrusion nozzle having an annular orifice adjacent to its discharge end through which plastic material may be extruded laterally of the nozzle, means for extruding plastic material through said nozzle, means including a mold associated with said nozzle for forming plastic material extruded therethrough into a hollow body of a desired shape which body is still integral with the plastic material within said nozzle, and an annular member constructed and arranged to be slidable axially on the outside of said nozzle and having a substantially annular shearing edge for severing the plastic material of the article within said mold from the plastic material within said nozzle and operating thereafter in cooperation with the upper portion of said mold to press-form a lip portion on the article.

ENOCH T. FERNGREN.

CERTIFICATE OF CORRECTION.

Patent No. 2,175,053.                                October 3, 1939.

ENOCH T. FERNGREN.

It is hereby certified that error appears in the printed specification of the above numbered patent requiring correction as follows: Page 7, second column, line 49, for the word "in" read by the; and line 50, for "by the" read in; line 69, before "bottom" insert integral; page 14, second column, line 53, claim 35, for "orifice" read article; and that the said Letters Patent should be read with this correction therein that the same may conform to the record of the case in the Patent Office.

Signed and sealed this 5th day of December, A. D. 1939.

(Seal)                                                            Henry Van Arsdale,
Acting Commissioner of Patents.